United States Patent
Figge et al.

(10) Patent No.: US 8,066,465 B2
(45) Date of Patent: Nov. 29, 2011

(54) FASTENING DEVICE WITH TOLERANCE COMPENSATION

(75) Inventors: Hans Ulrich Figge, Schloss Holte-Stukenbrock (DE); Ingo Burger, Schloss Holte-Stukenbrock (DE)

(73) Assignee: Bollhoff Verbindungstechnik GmbH (DE)

( * ) Notice: Subject to any disclaimer, the term of this patent is extended or adjusted under 35 U.S.C. 154(b) by 1025 days.

(21) Appl. No.: 11/836,489

(22) Filed: Aug. 9, 2007

(65) Prior Publication Data
US 2008/0038090 A1    Feb. 14, 2008

(30) Foreign Application Priority Data
Aug. 14, 2006    (DE) .................... 20 2006 012 493 U

(51) Int. Cl.
*F16B 43/02*    (2006.01)
(52) U.S. Cl. .......................... 411/546; 411/34
(58) Field of Classification Search .............. 411/546, 411/34, 369, 389, 37, 38, 542, 183, 535, 411/432, 433; 403/409.1
See application file for complete search history.

(56) References Cited

U.S. PATENT DOCUMENTS

| | | | |
|---|---|---|---|
| 5,288,191 A | 2/1994 | Ruckert et al. | |
| 6,776,566 B2 * | 8/2004 | Kobusch et al. | 411/546 |
| 7,025,552 B2 * | 4/2006 | Grubert et al. | 411/546 |
| 7,226,263 B2 * | 6/2007 | Schwarzbich | 411/546 |
| 7,241,097 B2 * | 7/2007 | Dembowsky et al. | 411/369 |
| 7,393,169 B2 * | 7/2008 | Sußenbach | 411/38 |
| 2002/0176738 A1 | 11/2002 | Kluting | |
| 2003/0077118 A1 | 4/2003 | Kobusch et al. | |
| 2008/0206011 A1 * | 8/2008 | Wille | 411/34 |

FOREIGN PATENT DOCUMENTS

| | | |
|---|---|---|
| DE | 43 14 431 A1 | 11/1994 |
| DE | 42 24 575 C2 | 7/2000 |
| DE | 199 49 654 A1 | 4/2001 |
| DE | 101 51 383 A1 | 4/2003 |
| DE | 20 2005 010 885 U1 | 10/2005 |
| DE | 10 2004 044 055 A1 | 3/2006 |

* cited by examiner

*Primary Examiner* — Flemming Saether
(74) *Attorney, Agent, or Firm* — Seyfarth Shaw LLP

(57) ABSTRACT

A device for fastening components with automatic compensation of tolerances of the spacing therebetween, comprising a base unit including a blind rivet nut securable to one of the components, a threaded adjusting nut and a sleeve-shaped retainer adapted to receive, an adjusting unit including a threaded sleeve, a locating plate and a driving bush connecting the threaded sleeve and the locating plate, the threaded sleeve adapted to be being screwed into the adjusting nut via a first thread pairing of a first thread direction, and a fastening screw which may be screwed into the rivet nut secured to one of the components via a second thread pairing of an opposing second thread direction, forming with the driving bush a releasable connection so that the adjusting unit rotates during rotation of the fastening screw, moving the locating plate into contact with the second component.

18 Claims, 4 Drawing Sheets

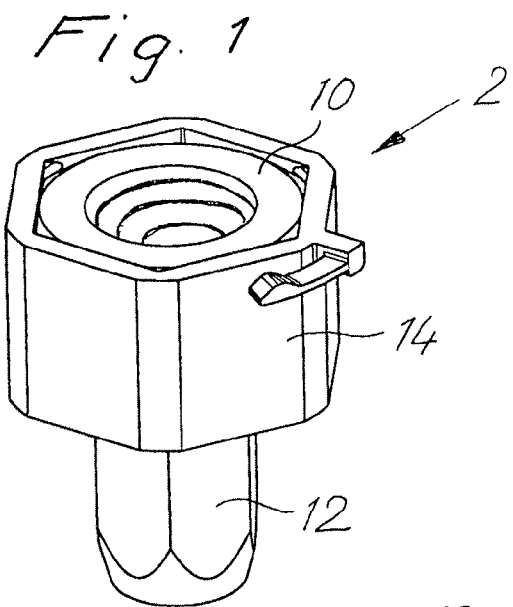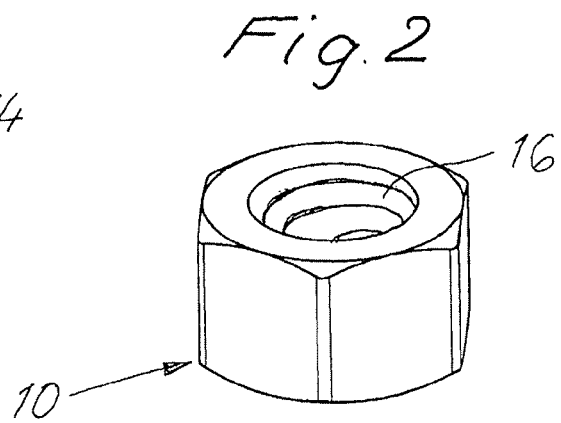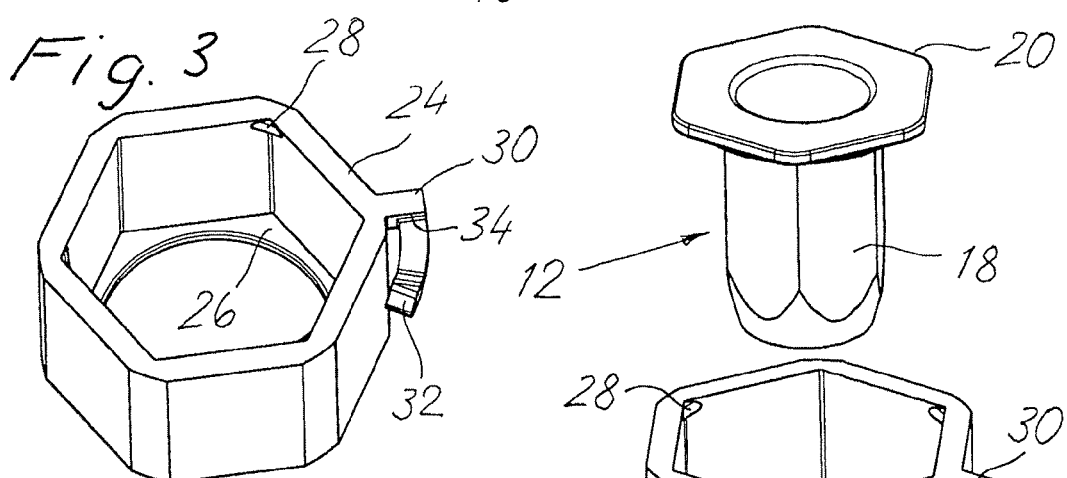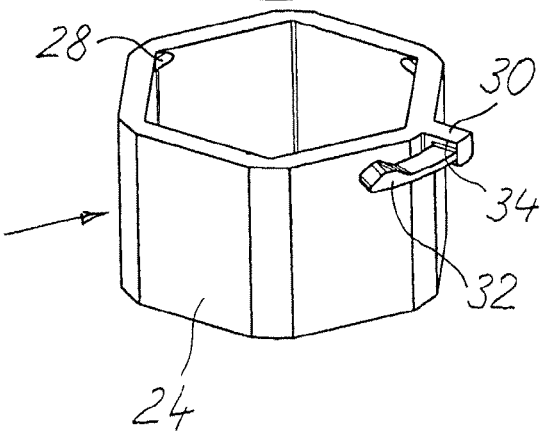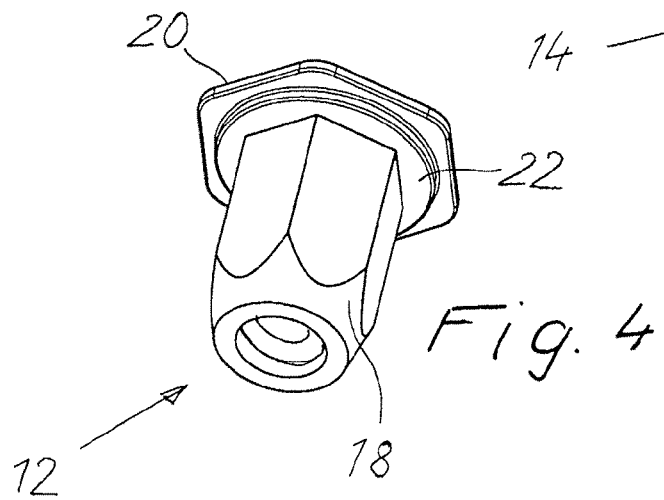

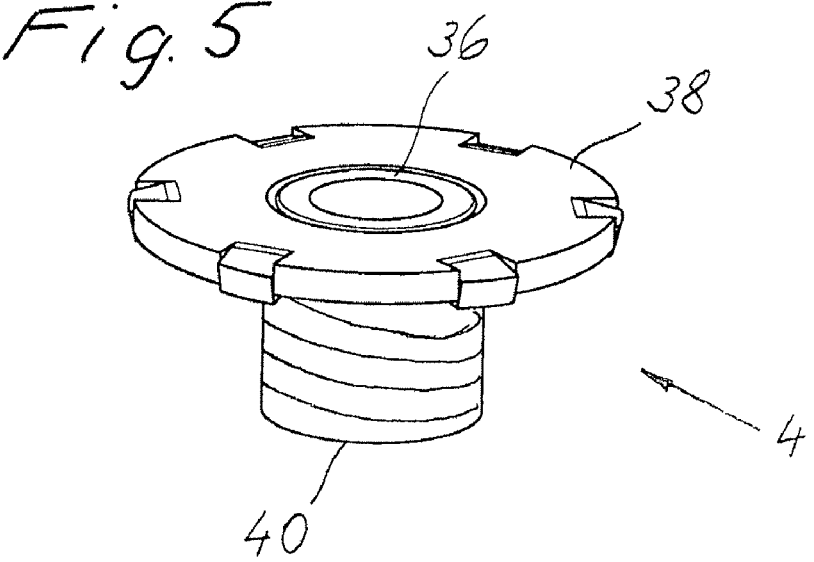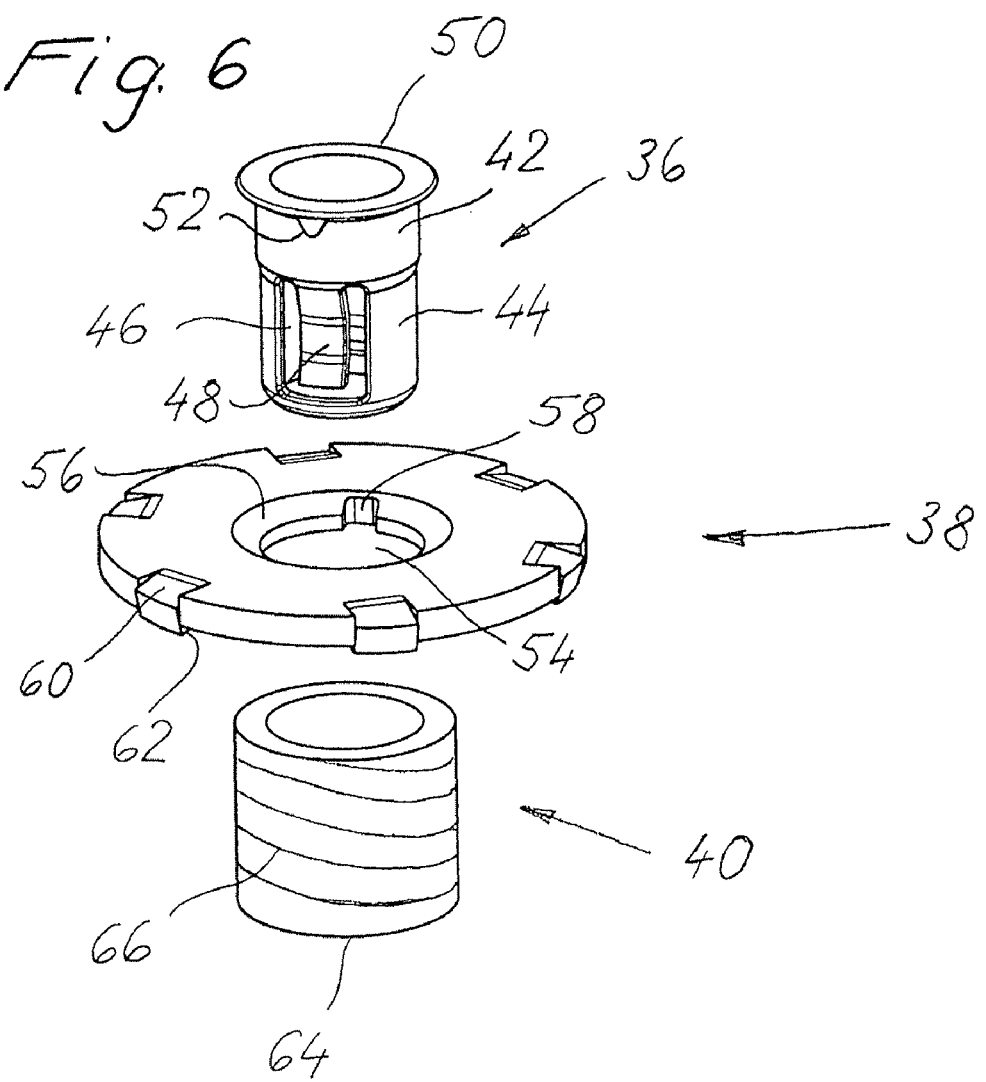

FASTENING DEVICE WITH TOLERANCE COMPENSATION

CROSS-REFERENCE TO RELATED APPLICATION

This application claims foreign priority benefits of foreign application DE 20 2006 102 493.4, filed Aug. 14, 2006.

FIELD OF THE INVENTION

The present invention relates to a fastening device for fastening a component B to a component A with automatic compensation of tolerances in the spacing between the two components.

BACKGROUND OF THE INVENTION

Such fastening devices with tolerance compensation are known in large numbers. For example, DE 101 51 383 shows such a fastening device which consists of a base element in the form of a blind rivet nut, an adjusting bush and a fastening screw. The blind rivet nut may be secured to the component A and comprises two axially opposing offset internal threads of which one thread forms, with an external thread of the adjusting bush, a thread pairing of a first thread direction and the other thread forms, with the thread of the fastening screw, a thread pairing of an opposing second thread direction. The adjusting bush is provided with resilient fingers distributed over the periphery which, when the fastening screw is screwed into the adjusting bush, bear against the thread of the screw and form therewith a so-called coupled connection. When screwing in the screw, therefore, the adjusting bush is turned therewith and as a result screwed out of the blind rivet nut until a flange of the adjusting bush, for the purpose of tolerance compensation, bears against the component A. When turning the fastening screw further and with a corresponding increase in torque, the coupled connection is released, so that then the two components may be tensioned by the fastening screw via the adjusting bush and the blind rivet nut.

The previously known fastening device has proved advantageous in practice. However, it is relatively costly as the blind rivet nuts are complicated components which are costly in production, due to the two threads of different thread directions and, in particular, the adjusting bush with the resilient fingers. The two elements also have to be produced from relatively costly material, in order to fulfil the various requirements to be set therefor such as the connection strength and resilient properties of the "coupled fingers".

The object of the present invention is to provide a fastening device for fastening a component B to a component A with automatic compensation of tolerances in the spacing between the two components which is cost-effective in production and is nevertheless able to absorb high connecting forces.

SUMMARY OF THE INVENTION

This object is achieved according to the invention by the fastening device defined in claim 1.

The fastening device configured according to the invention is made up of a base unit which consists of a blind rivet nut which may be secured to the component A, a threaded adjusting nut and a sleeve-shaped retainer which receives the threaded adjusting nut and connects said threaded adjusting nut to the blind rivet nut, an adjusting unit which consists of a threaded sleeve, a locating plate and a driving bush which connects the threaded sleeve and the locating plate, the threaded sleeve of the adjusting unit being able to be screwed into the threaded adjusting nut of the base unit via a first thread pairing of a first thread direction and a fastening screw which may be screwed into the blind rivet nut secured to the component A via a second thread pairing of an opposing second thread direction and forms with the driving bush a releasable coupled connection in order to rotate the adjusting unit during rotation of the fastening screw and thereby to move the locating plate into contact with the component B for the purpose of tolerance compensation.

A substantial advantage of the fastening device configured according to the invention is that it is made up of individual parts which are geometrically particularly simple. The blind rivet nut and the threaded adjusting nut may be standard fastening elements. The threaded sleeve and the locating plate of the adjusting unit are elements which are simple and easy to produce. The retainer and the driving bush which do not have to transmit any fastening forces, may be produced from plastic and produced, for example, by injection moulding. Although the fastening device consists of a larger number of individual parts, therefore, it may be produced markedly more cost effectively than the fastening device of the aforementioned DE 101 51 383.

Moreover, by the specific choice of material of the individual parts transmitting the fastening forces, a high connecting strength may be achieved. In a further embodiment of the invention, the blind rivet nut and the threaded adjusting nut of the base unit as well as the threaded sleeve and the locating plate of the adjusting unit are produced from a metallic material, in particular steel. In this manner, with the fastening device configured according to the invention, a connecting strength of strength class 8 may be easily achieved.

In a further embodiment of the invention, it is provided that the fastening unit and the adjusting unit may be combined to form an assembly unit which may be secured by positioning the blind rivet nut on the component A. The assembly unit consisting of the base unit and the adjusting unit may, therefore, be delivered by a supplier in the preassembled state to an end consumer, for whom the assembly of the fastening device with the tolerance compensation is, therefore, designed to be particularly easy. Preferably, the base unit and the adjusting unit in the assembly unit are unreleasably held together by a transport securing device.

As is revealed from the aforementioned descriptions, the base unit and the adjusting unit respectively consist of three individual parts so that the assembly unit is made up of six individual parts.

Further advantageous embodiments and developments of the invention are defined in the sub-claims.

BRIEF DESCRIPTION OF THE DRAWINGS

An embodiment of the invention is described in more detail with reference to the drawings, in which:

FIG. 1 shows a perspective view of a base unit for a fastening device configured according to the invention;

FIG. 2 shows an exploded view of the base unit in FIG. 1;

FIG. 3 shows a perspective view of a retainer of the base unit in FIGS. 1 and 2;

FIG. 4 shows a perspective view of a blind rivet nut of the base unit in FIGS. 1 and 2;

FIG. 5 shows a perspective view of an adjusting unit for the fastening device;

FIG. 6 shows a perspective exploded view of the adjusting unit in FIG. 5;

DETAILED DESCRIPTION OF THE PREFERRED EMBODIMENTS OF THE INVENTION

Figure 9:
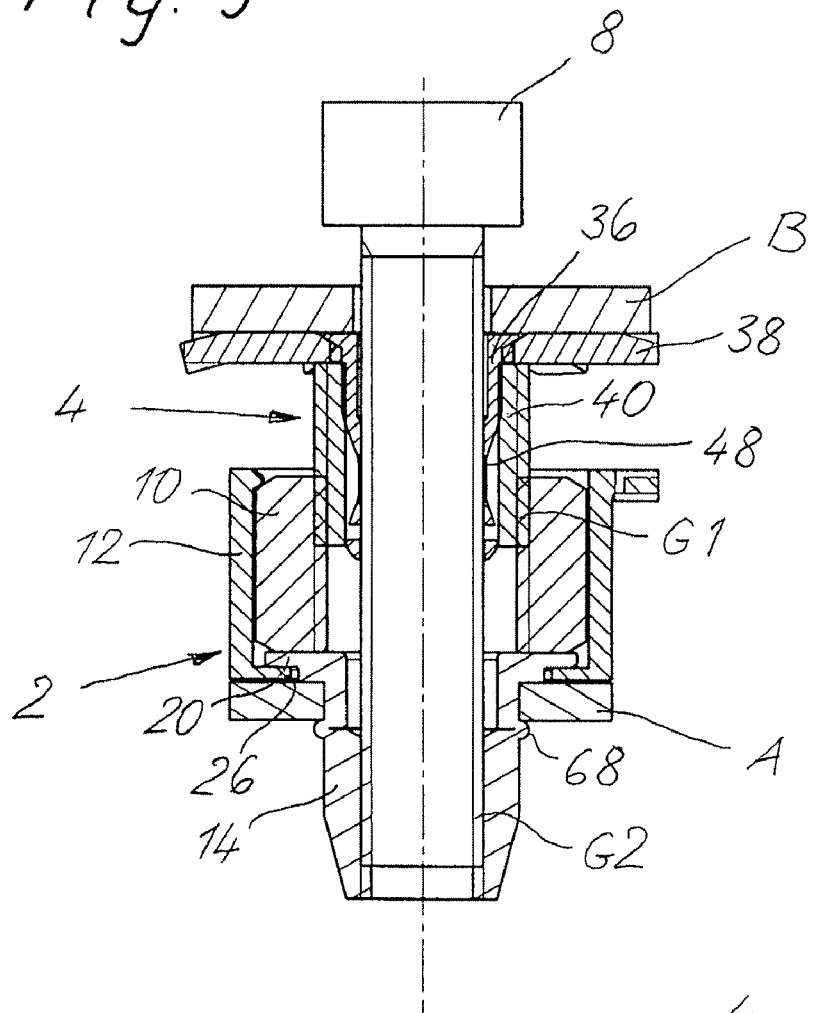
FIGS. 8 and 9 show sectional views of the fastening device with the assembly unit of FIG. 7 before and/or after the production of a connection between two components.
Figure 8:
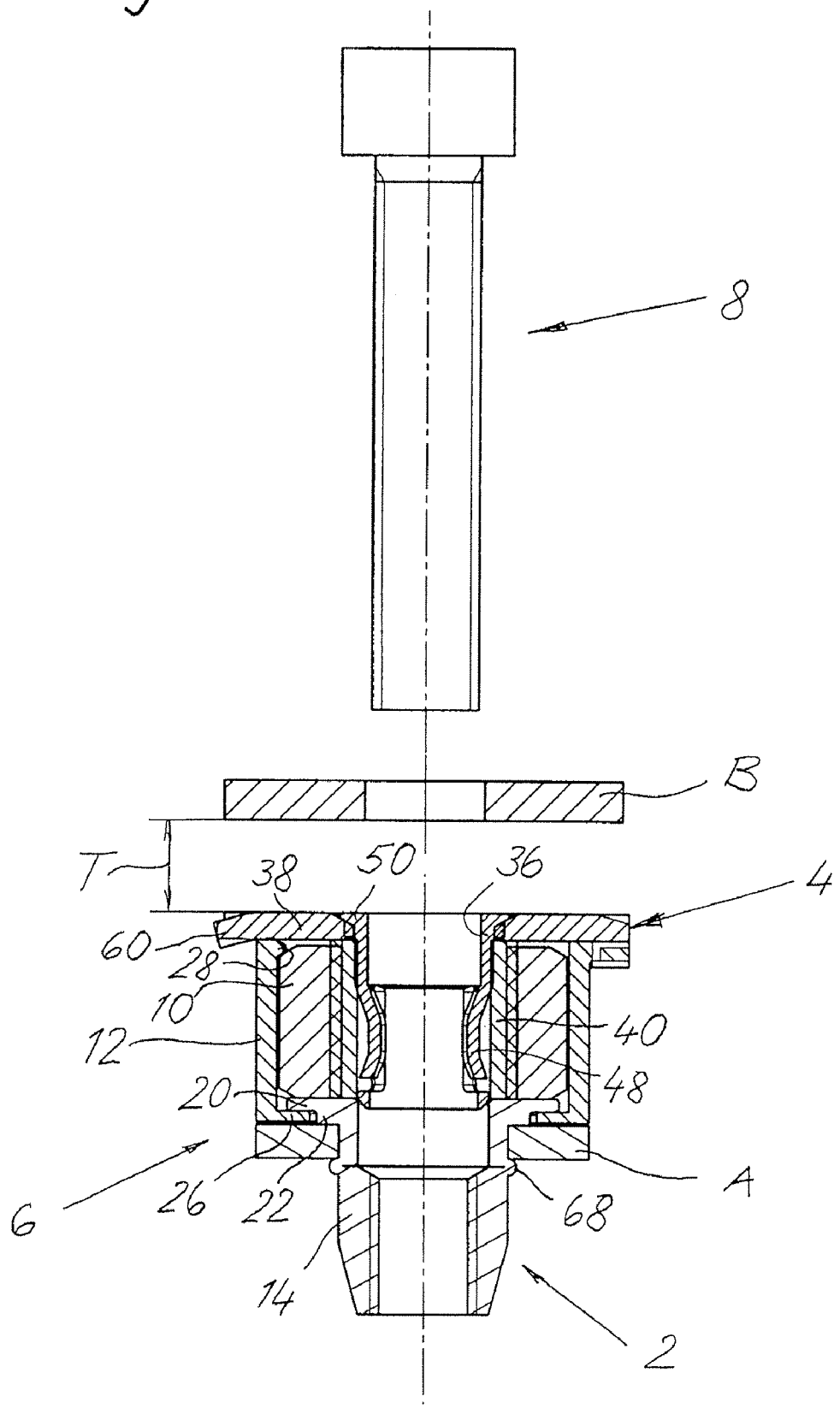

The fastening device shown in FIGS. 8 and 9 serves to fasten a component B to a component A. The two components A, B have a spacing from one another, which may vary due to tolerances required by the assembly and/or production. The fastening device shown allows an automatic compensation of said tolerances as is described further in more detail.

Figure 7:
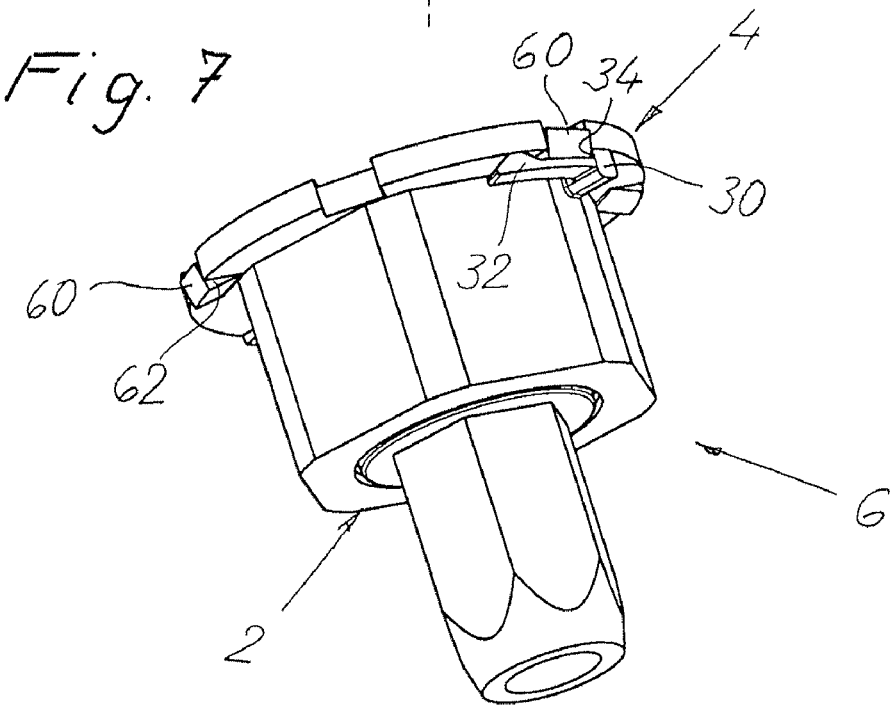
FIG. 7 shows a perspective view of an assembly unit, which is made up of the base unit of FIG. 1 and the adjusting unit of FIG. 5.

The fastening device consists of a base unit 2 (FIGS. 1 to 4), an adjusting unit 4 (FIGS. 5, 6) and a fastening screw 8 (FIGS. 8, 9). The base unit 2 and the adjusting unit 4 may be combined to form an assembly unit 6, which is shown in FIG. 7.

To describe the base unit 2, reference is now made to FIGS. 1 to 4. The base unit 2 consists of a threaded adjusting nut 10, a blind rivet nut 12 and a retainer 14. The threaded adjusting nut 10 is a conventional hexagonal nut which is provided in the embodiment shown, however, with a left-hand internal thread 16.

The blind rivet nut 12 is a conventional blind rivet nut with a sleeve-shaped shank 18 and a flange 20. The shank 18 is provided with an internal thread (FIGS. 8, 9), which is configured in the embodiment shown as a right-hand thread. The flange 20 has a hexagonal contour corresponding to the contour of the threaded adjusting nut 10 configured as a hexagonal nut. As may be seen in FIG. 10, the lower face of the flange 20 is provided with a circular thickened portion 22.

The retainer 14 consists of a sleeve-shaped body 24 of a hexagonal cross-section which is adapted to the hexagonal contour of the threaded adjusting nut 10 and the flange 20 of the blind rivet nut 12, so that the threaded adjusting nut 10 and the flange 20 of the blind rivet nut 12 may be positively received by the retainer 14. The retainer 14 is provided at its one axial end with an inwardly projecting annular flange 26 and at its other axial end with individual latching projections 28.

The threaded adjusting nut 10, the blind rivet nut 12 and the retainer 14 may, therefore, be combined to form the base unit 2 shown in FIG. 1, by the blind rivet nut 12 being previously inserted from above into the retainer 14 with its shank 18, such that the flange 20 of the blind rivet nut 12 rests against the flange 26 of the retainer 14 and the circular thickened portion 22 on the lower face of the flange 20 rests in the circular hole of the flange 26. The threaded adjusting nut 10 is then inserted from above into the retainer 14, such that it rests against the upper face of the flange 20 of the blind rivet nut 12 and is "latched" to the latching projections 28 of the retainer 14, see also FIGS. 8 and 9.

In the base unit 2 preassembled in this manner, the threaded adjusting nut 10 and the blind rivet nut 12 are secured against rotation relative to the retainer 14 by the "hexagonal" positive connection. Moreover, the threaded adjusting nut 10 and the blind rivet nut 12 are held axially by the flange 26 as well as the latching projections 28 of the retainer 14. The base unit 2 represents, therefore, a subassembly which may be handled as an independent unit.

As is shown in FIGS. 1 to 3, the retainer 14 is provided on its outer face, on one of its corners, with a radially outwardly projecting projection 30, on which an elastically flexible latching arm 32 extending in the peripheral direction is formed. A stop surface 34 is provided on the projection 30, adjacent to the latching arm 32, the purpose of which is described below.

The adjusting unit 4 is now described in more detail with reference to FIGS. 5 and 6. It consists of a driving bush 36, a locating plate 38 and a threaded sleeve 40.

The driving bush 36 has an upper cylindrical bush portion 42 and a lower partially cylindrical bush portion 44, which is provided with two diametrically opposing through-openings 46. The bush portion 42 extends approximately ⅓ of the length of the driving bush 36, whilst the remaining ⅔ of the length is taken up by the bush portion 44. One respective elastically flexible, axially extending spring arm 48 is provided inside the through-opening 46. The spring arm 48 is formed with its one axial end on the bush portion 42, has a radially inwardly concave curved shape and is free at its other axial end. The driving bush 36 is further provided at its upper axial end (in FIGS. 5, 6) with an annular projection 50, which is bevelled on the lower face, as may be seen in particular in FIGS. 8 and 9. A projection 52 is further provided on the lower face of the annular projection 50.

The locating plate 38 is a circular thin disk which is provided with a central hole 54. The periphery of the hole 54 is provided with a bevelled surface 56, which is adapted to the bevelled lower face of the annular projection 50 of the driving bush 36. On the periphery of the hole 54, moreover, a recess 58 is provided which is able to receive the projection 52 of the driving bush 36.

The locating plate 38 is provided on its periphery with six indentations distributed over the periphery, which form axially downwardly projecting latching projections 60 with lateral stop surfaces 62. The latching projections 60 of the locating plate 38 cooperate with the latching arms 32 of the retainer 14 as a transport securing device, as is described below in more detail.

The threaded sleeve 40 consists of a simple threaded tubular portion which, in the embodiment shown, is provided with a left-hand external thread 66 matching the internal thread 16 of the threaded adjusting nut 10, in order to form therewith a left-hand thread pairing G1. The threaded sleeve 40 may be easily produced by cutting off a corresponding threaded tube.

The adjusting unit 4 shown in FIG. 5 is preassembled such that the driving bush 36 is inserted from above (in FIG. 6) through the hole 54 of the locating plate 38 into the threaded sleeve 40, such that the projection 52 of the driving bush 36 engages in the recess 58 of the locating plate 38. The driving bush 36 and the locating plate 38 are thus secured against rotation.

The cylindrical bush portion 42 of the driving bush 36 has an external diameter which is slightly greater than the internal diameter of the cylindrical wall of the threaded sleeve 40. When inserting the threaded bush 36 into the threaded sleeve 40, therefore, an interference fit is produced therebetween, whereby the locating plate 38 is clamped between the annular projection 50 of the driving bush 36 and the axial end of the threaded sleeve 40 and the three elements 36, 38, 40 are held together as an adjusting unit 4.

The fastening screw 8 shown in FIGS. 8 and 9 is a conventional screw with a screw head and screw shank, which in the embodiment shown is provided with a right-hand external thread matching the internal thread of the blind rivet nut 12 in order to be able to form therewith a right-hand thread pairing G2.

As already mentioned, the threaded adjusting nut 10 and the blind rivet nut 12 of the base unit 2 as well as the locating plate 38 and the threaded sleeve 40 of the adjusting unit 4 consist of a metallic material, in particular steel, whilst the retainer 14 and the driving bush 36 consist of an elastically deformable plastic. The metallic material lends the corresponding elements sufficient strength for transmitting large forces as is described below in more detail. The plastic lends the retainer 14 and the driving bush 36 resilient properties which are required for "clipping in" the nuts 10, 12 in the retainer, for producing the transport securing device, to be described further, between the base unit 2 and the adjusting unit 4 as well as for producing a coupled connection, to be described further, between the driving bush 36 and the screw 8.

The fastening screw 8 consists of a metallic material, in particular steel.

The assembly of the fastening device for producing the connection between the components A and B (FIGS. 8 and 9) is now described:

In this case, it is assumed that the base unit 2 in the described manner is made up of the threaded adjusting nut 10, the blind rivet nut 12 and the retainer 14, and that the adjusting unit 4 in the described manner is made up of the driving bush 36, the locating plate 38 and the threaded sleeve 40. Before the fastening device is connected to the components A, B, the base unit 2 and the adjusting unit 4 are combined to form the assembly unit 6 (FIG. 7). To this end, the threaded sleeve 66 is screwed into the threaded adjusting nut 10. The thread of the threaded adjusting nut 10 and the threaded sleeve 40 thus form the left-hand thread pairing G1.

During this screwing-in process, the latching arm 32 of the retainer 14 comes into latching engagement with one of the latching projections 60 of the locating plate 38. As may be seen in particular in FIG. 7, in this case, the relevant latching projection 60 slides over a rounded raised portion of the elastically flexible latching arm 32, until the stop surface 62 of the relevant latching projection 60 comes into contact with the stop surface 34 on the radial projection 30 of the retainer 14. The stop limitation formed by the stop surfaces 34 and 62 prevents the adjusting unit 4 from being locked to the base unit 2. Moreover, the latching arm 32 and the latching projection 60 form a latching connection by which the base unit 2 and the adjusting unit 4 are unreleasably held together. Due to said transport securing device, the assembly unit 6 may be delivered by a supplier, for example, to an end customer who is then able to handle and assemble the assembly unit 6 as a unit, as is now described.

In order to attach the assembly unit 6 to the preassembled component A, the blind rivet nut 12 is inserted into a hole of the component A and secured to the component A by a folded bead 68 produced by means of a single spindle tool (not shown). The spring arms 48 are designed such that the single spindle tool may easily act on the blind rivet nut 12 through the inside of the driving bush.

The retainer 14 is arranged with radial play relative to the flange 20 of the blind rivet nut 12, so that the retainer 14 and the positively held threaded adjusting nut 10 may compensate for an axial offset of the blind rivet nut 12 produced by the positioning operation.

When positioning the blind rivet nut 12, the positioning force is exclusively transmitted via elements of the fastening device which consist of metallic material and namely from the blind rivet nut 12 via the threaded adjusting nut 10 and the threaded sleeve 40 to the locating plate 38.

When, therefore, the assembly unit 6 is secured to the component A by positioning the blind rivet nut 12, the component B may be assembled with the predetermined spacing to the component A. As the predetermined spacing between the components A and B may vary due to tolerances, an intermediate spacing T is provided between the upper face of the locating plate 38 and the lower face of the component B. The intermediate spacing T has to be bridged by the fastening device in order to produce a secure connection between the components A and B.

To this end, the screw 8 is inserted through a hole of the component B from above into the driving bush 36 as far as the internal thread of the blind rivet nut 12. In this case, the thread of the screw 8 presses against the spring arms 48 of the driving bush 36. In this manner, the spring arms 48, which bear with their free ends against the internal wall of the threaded sleeve 40, form with the screw 8 a frictionally engaged coupled connection, which ensures when the screw 8 is screwed into the blind rivet nut 12 that the adjusting unit 4 is turned therewith. The frictional force of the coupled connection, i.e. the frictional force between the spring arms 48 and the thread of the fastening screw 8, is so great that the latching projection 60 is disengaged from the latching arm 32. As the thread pairings G1 and G2 are of opposing thread directions, when screwing the fastening screw 8 into the blind rivet nut 12 the adjusting unit 4 is screwed out of the base unit 2, until the locating plate 38 bears against the lower face of the component B. If the fastening screw 8 is screwed further into the blind rivet nut 12, the coupled connection between the driving bush 36 and the fastening screw 8 is released, so that the component B may be clamped to the component A via the fastening device.

The invention claimed is:

1. Fastening device for fastening a component B to a component A with automatic compensation of tolerances in the spacing between the two components, comprising:
    a base unit which consists of a blind rivet nut which may be secured to the component A, a threaded adjusting nut and a sleeve-shaped retainer which receives the threaded adjusting nut and connects said threaded adjusting nut to the blind rivet nut,
    an adjusting unit which consists of a threaded sleeve, a locating plate and a driving bush which connects the threaded sleeve and the locating plate, the threaded sleeve of the adjusting unit being able to be screwed into the threaded adjusting nut of the base unit via a first thread pairing of a first thread direction, and
    a fastening screw which may be screwed into the blind rivet nut secured to the component A via a second thread pairing of an opposing second thread direction, and forms with the driving bush a releasable coupled connection in order to rotate the adjusting unit during rotation of the fastening screw and thereby to move the locating plate into contact with the component B for the purpose of tolerance compensation.

2. Fastening device according to claim 1, wherein the blind rivet nut and the threaded adjusting nut are secured against rotation by a positive connection with the retainer.

3. Fastening device according to claim 1, wherein the retainer is radially movable relative to the blind rivet nut for compensating for an axial offset therebetween.

4. Fastening device according to claim 1, wherein the retainer comprises at one axial end a radially inwardly projecting flange which in the fully assembled state of the fastening device is located between a flange of the blind rivet nut and the component A.

5. Fastening device according to claim 4, wherein the threaded adjusting nut is axially held in the retainer between the flange of the blind rivet nut and the shaped latching projections of the retainer.

6. Fastening device according to claim 1, wherein the locating plate is held between an annular projection of the driving bush and an associated axial end of the threaded sleeve.

7. Fastening device according to claim 1, wherein the driving bush and the locating plate are secured against rotation relative to one another by a positive connection.

8. Fastening device according to claim 1, wherein the driving bush extends through a central hole of the locating plate and is held by an interference fit in the threaded sleeve.

9. Fastening device according to claim 1, wherein the driving bush has at least one radially flexible spring arm which, by bearing against the outer periphery of the fastening screw, forms the releasable coupled connection.

10. Fastening device according to claim 9, wherein the spring arm is formed with an axial end on the remaining part of the driving bush and is supported with an opposing axial end on the inner wall of the threaded sleeve.

11. Fastening device according to claim 1, wherein the base unit and the adjusting unit are unreleasably held together by a transport securing device.

12. Fastening device according to claim 11, wherein the transport securing device consists of a latching connection between the retainer and the locating plate.

13. Fastening device according to claim 12, wherein the latching connection comprises an elastically flexible latching arm formed on the retainer and a plurality of latching projections distributed over the periphery of the locating plate.

14. Fastening device according to claim 13, wherein the latching arm extends in the peripheral direction of the retainer and is formed on a projection of the retainer projecting radially outwardly.

15. Fastening device according to claim 14, wherein the radially outwardly projecting projection of the retainer has a stop surface on which one of the latching projections of the locating plate bears when the threaded sleeve is screwed into the threaded adjusting nut, in order to prevent the adjusting unit from being locked to the base unit.

16. Fastening device according to claim 1, wherein the base unit and the adjusting unit may be combined to form an assembly unit which may be secured by positioning the blind rivet nut on the component A.

17. Fastening device according to claim 1, wherein the blind rivet nut and the threaded adjusting nut of the base unit as well as the threaded sleeve and the locating plate of the adjusting unit consist of a metallic material.

18. Fastening device according to claim 1, wherein the retainer and the driving bush consist of plastic.

* * * * *